UNITED STATES PATENT OFFICE.

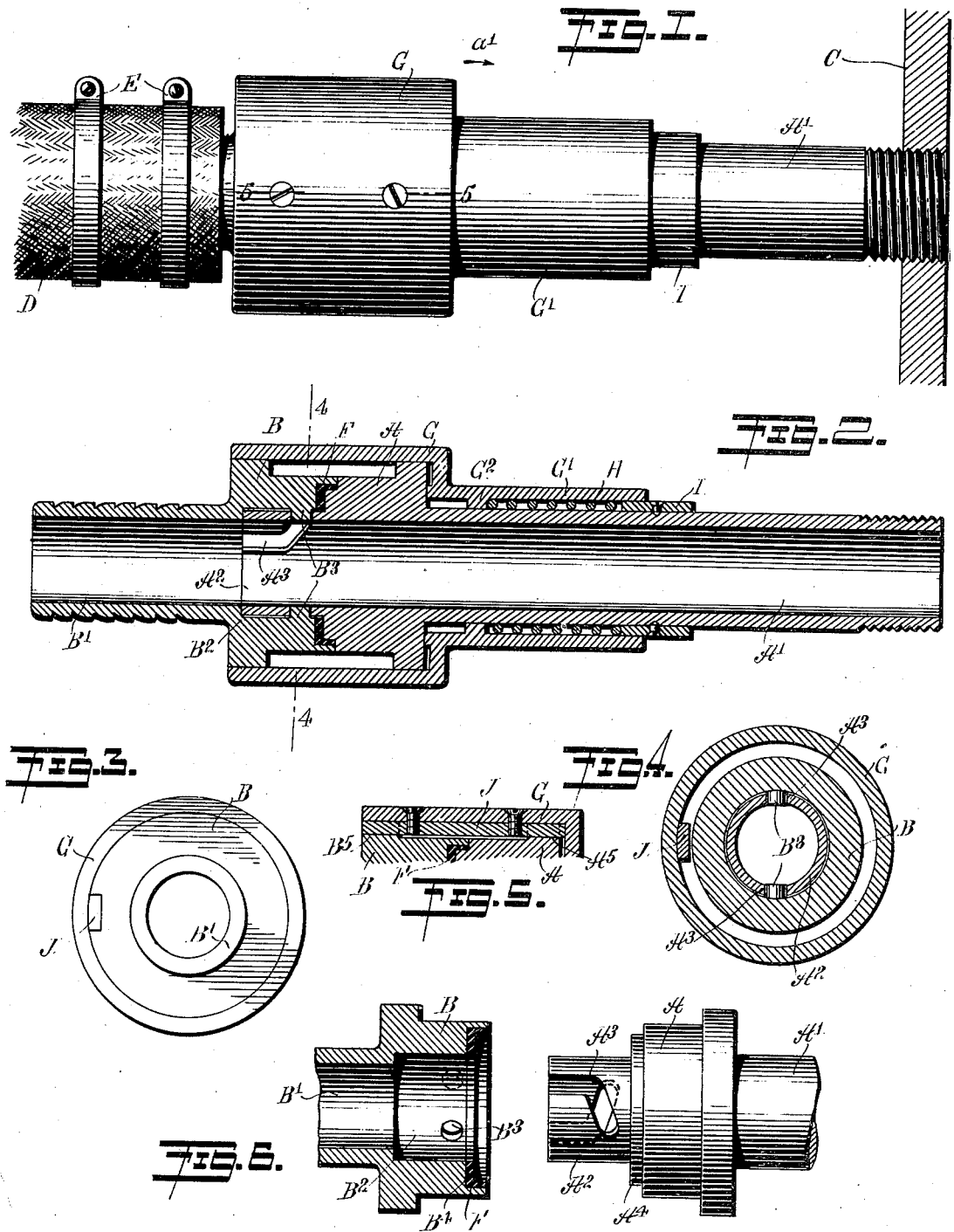

FRITZ A. SCHNEIDER, OF NEW YORK, N. Y.

HOSE-COUPLING.

1,001,994.  Specification of Letters Patent.  Patented Aug. 29, 1911.

Application filed July 11, 1910. Serial No. 571,324.

*To all whom it may concern:*

Be it known that I, FRITZ A. SCHNEIDER, a citizen of the United States, and a resident of the city of New York, borough of the Bronx, in the county and State of New York, have invented a new and Improved Hose-Coupling, of which the following is a full, clear, and exact description.

The object of the invention is to provide a new and improved hose coupling, arranged to permit quick coupling and uncoupling of the members, at the same time insuring a tight joint with a view to prevent leakage when the members are coupled. For the purpose mentioned use is made of coupling members, of which one is provided with a bayonet slot and the other with a stud for engaging the said bayonet slot, and a spring-pressed locking sleeve mounted to slide on one of the said coupling members and provided with a key adapted to engage key-ways on the coupling members, the said key and key-ways standing at an angle to the bayonet slot and stud.

A practical embodiment of the invention is represented in the accompanying drawings forming a part of this specification, in which similar characters of reference indicate corresponding parts in all the views.

Figure 1 is a plan view of the hose coupling as applied; Fig. 2 is a longitudinal central section of the hose coupling; Fig. 3 is an end view of the same; Fig. 4 is a cross section of the same on the line 4—4 of Fig. 2; Fig. 5 is a sectional side elevation of the locking connection between the coupling members, the section being on the line 5—5 of Fig. 1; and Fig. 6 shows the coupling members detached one from the other, one of the members being shown in longitudinal section and the other in elevation.

The coupling members A and B are provided with the pipes or nipples $A'$, $B'$, of which the pipe $A'$ is preferably screwed to a supply pipe C, as indicated in Fig. 1, while the pipe or coupling $B'$ is engaged by one end of a hose D fastened in place by suitable clamps E or other means. The coupling member A is provided with a tubular extension $A^2$ adapted to pass into a seat $B^2$ formed in the coupling member B, and in the said extension $A^2$ are arranged two oppositely-disposed bayonet slots $A^3$ adapted to be engaged by studs or pins $B^3$ arranged in the seat $B^2$ of the coupling member B. Thus, in order to couple the members A and B, the extension $A^2$ and the seat $B^2$ are slipped one in the other with the studs $B^3$ engaging the slots $A^3$, and by giving the coupling member B a quarter turn the studs $B^3$ reach the inner ends of the bayonet slots $A^3$. A packing F is held in a seat $B^4$, arranged on the coupling member B, and the packing F is adapted to be engaged by an annular shoulder $A^4$ formed on the coupling member A, so that when the members A and B are coupled together as above described, then the shoulder $A^4$ is firmly drawn in engagement with the elastic packing F to insure an exceedingly tight joint between the coupling members A and B (see Fig. 2).

In order to lock the coupling members A and B in the connected position, the following arrangement is made: A locking sleeve G is mounted to slide on the coupling member A and is provided with a reduced extension $G'$, in which is coiled a spring H surrounding the pipe $A'$, the said spring H abutting against a shoulder $G^2$ formed on the inside of the extension $G'$ and the spring H resting on a collar I secured to the pipe $A'$. Thus by the arrangement described the locking sleeve G is normally held projected forwardly over the coupling member A to close the coupling member B at the time the members are coupled.

In the sleeve G is secured a longitudinally-extending key J, engaging key-ways $A^5$ and $B^5$ formed in annular peripheral flanges on the coupling members at the time the said members are in coupled position. The key J is at all times in engagement with the key-way $A^5$ and only moves into engagement with the key-way $B^5$ at the time the coupling members A and B are coupled together and the studs $B^3$ are at the inner ends of the bayonet slots $A^3$.

In coupling the member B to the member A, it is first necessary to slide the sleeve G lengthwise on the coupling member A in the direction of the arrow $a'$, then the coupling member B is engaged by its studs $B^3$ with the bayonet slots $A^3$, as previously explained, that is, the member B is moved lengthwise on the extension $A^2$ and given a quarter turn so as to bring the studs $B^3$ into the inner ends of the bayonet slots $A^3$ and at the same time moving the key-way $B^5$ into alinement with the key J, and then the operator releases the pressure on the sleeve, to allow the spring H to force the sleeve G forward, thus moving the key J into engagement with the key-way B⁵. To uncouple the members, the sleeve is moved lengthwise to remove the key from the key-way B⁵, after which operation the coupling B is uncoupled by turning the same, to disengage the studs B³ from the inner ends of the bayonet slots A³ and then removing the coupling member B from the coupling member A.

The hose coupling shown and described is very simple and durable in construction, and composed of comparatively few parts, not liable easily to get out of order.

Having thus described my invention, I claim as new and desire to secure by Letters Patent:

1. A hose coupling, comprising coupling members, of which one is provided with a bayonet slot and the other with a stud for engagement with the said slot, the said coupling members having annular peripheral flanges, and a spring pressed sleeve slidable lengthwise on the member having the bayonet slot and provided on the inside with a longitudinally extending key, the flange of the coupling member having the stud being provided with a key-way, the said key being in register with the said key-way at the time the stud is in position at the inner end of the bayonet slot.

2. A hose coupling, comprising coupling members, of which one is provided with a bayonet slot and the other with a stud on its inner face for engagement with the said slot, the said members being each provided with an annular peripheral flange having a lengthwise-extending key-way, a spring-pressed sleeve slidable lengthwise on one of the coupling members, and a key on the said sleeve and at all times in engagement with the key-way on one of the said coupling members and adapted to register with the key-way on the other coupling member at the time said stud is in position at the inner end of the said bayonet slot.

3. A hose coupling, comprising coupling members, of which one is provided with a tubular extension having a bayonet slot and the other with a seat into which the tubular extension passes, the seat having a stud for engagement with the said slot, the outer portion of said slot extending longitudinally and the inner portion extending at an obtuse angle to the outer portion, the said coupling members having annular peripheral flanges provided with lengthwise-extending key-ways adapted to register one with the other at the time the said stud is in position at the inner end of the bayonet slot, a sleeve slidable on the coupling member having the bayonet slot and adapted to inclose the same, a longitudinally extending key secured to the inside of said sleeve and permanently engaging the key-way of the coupling member on which the sleeve is mounted and adapted to engage the key-way of the other coupling member, and a spring pressing the said sleeve in the direction of its length.

In testimony whereof I have signed my name to this specification in the presence of two subscribing witnesses.

FRITZ A. SCHNEIDER.

Witnesses:
  HUGO H. SCHEEREN,
  RUDOLF ROEHRICH.